Aug. 8, 1967 W. B. JORDEN 3,335,383
HALL-EFFECT MULTIPLIER
Filed Jan. 4, 1965

*INVENTOR.*
WILLIAM B. JORDEN
BY
*R. J. Frank*
ATTORNEY.

3,335,383
HALL-EFFECT MULTIPLIER
William B. Jorden, Malverne, N.Y., assignor to General Telephone and Electronics Laboratories, Inc., a corporation of Delaware
Filed Jan. 4, 1965, Ser. No. 423,176
13 Claims. (Cl. 338—32)

ABSTRACT OF THE DISCLOSURE

A Hall-effect multiplier is described in which first and second E-core sections have a gap between the center arms which contains the Hall element. One of the sections is divided into two symmetrical subsections so that the external coupling loop to the Hall element contains no magnetic material therein and spurious fields and mutual inductance is substantially eliminated.

This invention relates to a Hall-effect multiplier.

The Hall-effect is the development of a transverse, electric potential-gradient in a current-carrying conductor upon the application of a magnetic field. In terms of a thin rectangular conductor, a voltage appears across the width thereof when a control current flows along the length and the magnetic field has a component perpendicular to the surface of the conductor. The voltage appearing across the conductor is a function of the vector product of the control current density and the magnetic field strength. Alternately, since the perpendicular magnetic field is derived from a current-carrying field coil, the Hall voltage generated across the conductor may be expressed as a function of the product of two currents.

In practice, multipliers employing the Hall-effect are constructed using thin rectangular semiconductor Hall elements positioned in the gap of a magnetic core circuit. The circuit has two inputs: (1) the control current to the Hall element and (2) the current to the field coil. These inputs may be either alternating, direct or a combination thereof. The Hall voltage is a function of the product of these two inputs and is the output of the multiplier taken across the Hall element.

Depending on the input currents, the multiplier may be used in numerous applications. One such application is a modulator for carrier system communications, wherein the control signal and field current are the intelligence signal and the desired carrier.

In an ideal multiplier, the only interaction between the two input circuits and the output circuit is the production of an output voltage across the element due to Hall-effect deflection of the control current by the magnetic field. However, this is not the only interaction found to occur between the input and output circuits. These three circuits are coupled to one another by undesirable mutual inductances due to common flux linkages. Therefore, when a signal is applied to a given pair of terminals or port, the effect of the mutual inductance is to cause a component proportional to the derivative of that signal to appear at each of the other two ports. In addition, harmonic distortion is present due in part to the fact that the spurious component proportional to the derivative of a sinusoidal field current in turn produces an output component at twice the frequency of the field current as a result of Hall-effect multiplication.

Another consequence of undesirable magnetic couplings is the generating of spurious magnetic fields which in turn produce additional unwanted Hall-effect outputs. The control current has been found to induce a magnetic field in the magnetic core at the control frequency which in turn, reacts on the control current itself to produce an output signal at twice the control signal frequency. This output is not a function of the derivative of the control current and will result in amplitude distortion even when a direct control current is employed.

The overall effect of the mutual inductances and the spurious signal induced magnetic fields is to have the derivative of each of the applied signals appear at the output along with products produced by squaring each signal, in addition to a number of other self- and cross-products. This distortion has generally required extensive external filtering and resulted in a decrease in efficiency of operation for Hall-effect multipliers.

Accordingly, it is an object of the present invention to provide a Hall-effect multiplier in which such output distortion is substantially reduced.

Another object is to provide a Hall-effect multiplier wherein the effects of the mutual inductances and the spurious signal-induced magnetic fields are concomitantly suppressed.

A further object is the provision of a Hall-effect multiplier wherein the need for extensive filtering is substantially obviated.

In accordance with the present invention, first and second E-shaped magnetic core sections are mated such that a gap exists between the respective center arms. A Hall-element comprised of a thin rectangular semiconductor wafer is mounted in a suitable insulating material, such as epoxy, and is centrally position in the gap between the center arms. The field coil is located about the center arm of one or both of the magnetic core sections. When the field coil is energized, a magnetic field is produced in the gap which is essentially perpendicular to the major face of the Hall-effect element.

One pair of terminals for the Hall-effect element is located on opposing outer edges thereof in the horizontal plane passing through the center of the major face with the external coupling to the corresponding port being taken on either side of the E-shaped core sections. Thus the coupling may be considered to form a conductive loop wherein the net flux generated by the field current and enclosed in this loop is zero. This may be seen by considering that the magnetic field in the center arm of the mated E-shaped core sections is twice the magnitude and opposite in direction to that found in either outside leg of the E-shaped core section. Thus, mutual inductance between this circuit and the field current circuit is essentially eliminated.

A second pair of terminals is located on the remaining opposing edges in the vertical plane passing through the center of the major face of the rectangular Hall-element and is advantageously positioned equidistant from the first pair of terminals. This in effect balances the Hall-element since the resistances between adjacent terminals are substantially equal.

The external coupling for the second pair of terminals must be such that the mutual inductance between this circuit and both the field current and first terminal circuits is substantially zero. In addition, the conductive loop formed by the external coupling of the second pair of terminals should enclose substantially no magnetic material therein to prevent the generation of spurious magnetic fields in the magnetic core structure.

To this end, the magnetic core structure is provided with a centrally located coupling passage extending therethrough. The coupling passage is located at the magnetic center of the core structure so that the conductive loop formed by the external coupling passing therethrough encloses essentially no net magnetic flux. As referred to herein, the magnetic center may be considered to be a line on the core structure positioned such that equal amounts of magnetic flux exist on either side thereof. Generally for core structures formed of uniform magnetic material, the magnetic center may be located by dividing the magnetic core section into two symmetrical halves.

The afore-mentioned coupling passage also enables the external coupling to the second pair of terminals to enclose essentially no magnetic material and therefore substantially eliminates the generation of spurious magnetic fields due to current flowing therein.

In a preferred embodiment of the invention, the second E-shaped core section is divided into two symmetrical halves to provide a centrally located coupling passage therebetween. These halves, which meet at any desired angle, join to form a composite center arm face shaped to match that of the mating first E-shaped core section.

The second pair of terminals is externally coupled by leads passing between the two symmetrical halves of the second core section. This structure, referred to as "open book," enables the external coupling to in effect pass through the core and eliminate the presence of magnetic core material in the coupling loop. This in turn eliminates the induction of a magnetic field in the core section from the control current port to prevent spurious control current induced magnetic fields, as well as removing the mutual inductance between the control current circuit and the field current and output circuits.

Further features and advantages of the present invention will become readily apparent from the following detailed description when taken in conjunction with the accompanying drawings, in which—

Figure 1:
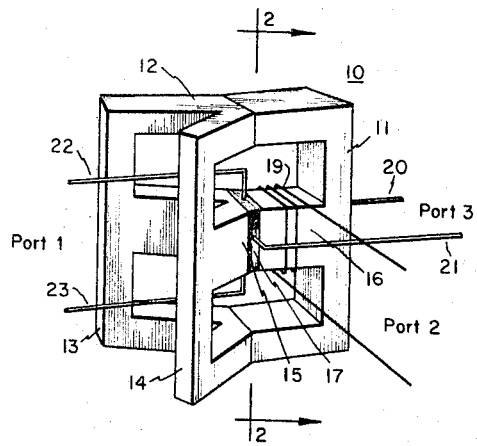
FIG. 1 is a view in perspective of one embodiment of the invention.

Referring now to the embodiment of FIG. 1, a Hall-effect multiplier is shown comprising a magnetic core structure 10 formed of first and second mating E-shaped core sections 11 and 12.

Figure 3:
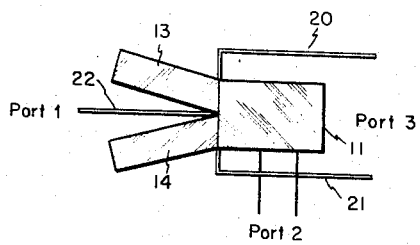
FIG. 3 is a top view of the embodiment shown in FIG. 1.

Second core section 12 is divided into two symmetrical halves 13 and 14, shown more clearly in FIG. 3, to provide a centrally located opening in the core structure. These halves, which may meet at any desired angle, join to form composite contacting surfaces for mating the other legs therof with the outer legs of first core section 11. In addition, the halves 13 and 14 join to form a composite face for center arm 15 shaped to match center arm 16 of the mating first core section 11.

Figure 2:
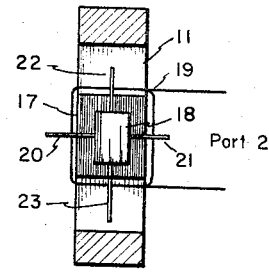
FIG. 2 is a view taken along line 2—2 of FIG. 1.

Center arms 15 and 16 are gapped and a Hall-effect element 18, seen in FIG. 2, is mounted therebetween. Hall-effect element 18 may be formed of a thin rectangular semiconductor wafer, such as indium antimonide, indium arsenide, germanium and the like. The element 18 is provided with four edge contacts which are advantageously located at the midpoints of its four edges and is embedded in an insulating block 17 formed of epoxy or the like. By so locating the edge contacts, the Hall-element is balanced in that the distance and thus the resistance between adjacent contacts is substantially equal.

The Hall-element 18 contained in insulating block 17 is then centrally located in the gap between mated center arms 15 and 16 with its major face positioned normal to the direction of the center arms. The Hall-element is positioned between the arms such that one pair of opposing contacts lie in the vertical plane extending through the center of mating surface of the center arms and the other pair of opposing contacts lie in the horizontal plane passing therethrough. As shown in FIG. 2, each pair of opposing contacts resides on a line bisecting the mating surface area of the center arms.

A field winding 19 is placed about center arm 16 and is coupled at Port 2 to a suitable energizing means (not shown). It will be recognized that field winding 19 may be placed about either or both center arms 15 and 16 as desired. When winding 19 is so energized, a magnetic flux is established in magnetic core structure 10. The flux provides a substantially uniform magnetic field in the gap between center arms 15 and 16 which is essentially perpendicular to the large-area surfaces of the Hall-element.

The magnetic flux established in center arm 16 is divided into two equal components in the outer legs of first core section 11. The flux in the outer legs of core section 11 is further halved by the symmetrical outer legs 13 and 14 of second core section 12. The flux path is completed through the symmetrical portions of center arm 15, each of which contain one-half of the total flux established in center arm 16.

The coupling leads 20 and 21 for the horizontal pair of Hall-element edge contacts extend outwardly on either side of core structure 10 to form Port 3. Port 3 in turn may be coupled to a suitable utilization circuit (not shown). It will be noted that the net magnetic flux generated by the energization of winding 19 and enclosed in the conducting loop formed by leads 20, 21 and Port 3 is zero. Although leads 20 and 21 are shown in FIGS. 1 and 2 as extending outwardly in a horizontal manner from center arm 16 and core section 11, the net flux enclosed in the circuit of Port 3 is essentially zero regardless of the location of Port 3. This result is obtained due to the fact that the Port 3 circuit in effect encloses one outside leg of the structure and one-half of the center arm. Thus, substantially no mutual inductance exists between the field circuit and the circuit of Port 3.

The leads 22 and 23 connected to the vertical pair of edge terminals on Hall-element 18 extend outwardly from the core structure through the opening between symmetrical halves 13 and 14 of second core section 12 to form Port 1. In this manner, the loop formed by Port 1 and leads 22 and 23 encloses essentially no portion of magnetic structure 10 and thus, mutual inductance between this circuit and the circuits of Ports 2 and 3 is in effect eliminated. In addition, the absence of magnetic material in the circuit of Port 1 eliminates the induction of a spurious magnetic field in the core structure when a control signal generator is coupled to Port 1.

The above described embodiment is well suited for use as a modulator wherein the carrier signal is supplied to the circuit of Port 1 and the audio signal supplied to the field circuit of Port 2 with the output taken at Port 3. However it is to be noted that Port 1 and Port 3 may be interchanged without affecting the above-described operation of the Hall-effect multiplier. In the construction of core structure 10, it has been found advantageous to use laminated E-shaped core sections because of the relative ease of forming two symmetrical half sectoins. However, it is apparent that other magnetic core materials may be employed.

Figure 4:
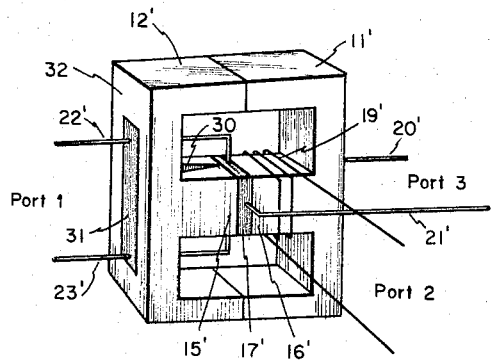
FIG. 4 is a view in perspective of a second embodiment of the invention.

Referring now to FIG. 4, a second embodiment is shown wherein the outer legs of core section 12' are not spread to form symmetrical halves, although, the center arm 15' is divided in a manner similar to that of center arm 15 of the embodiment of FIG. 1. A rectangular slot 31 is formed in end portion 32 of core section 12' and extends on either side of the center arm 15' to accommodate leads 22' and 23'. Slot 31 extends inwardly through portion 32 to an adjoining wedge-shaped slot 30 extending through center arm 15'.

Wedge-shaped slot 30 extends throughout the length of center arm 15' with its apex located at the mating surface thereof. Although the angle of the wedge is not critical, it should be kept small to avoid undue increases in the magnetic reluctance of core section 12'. While the slot 30 is shown having a wedge-shape to form a composite center arm face, in practice slot 30 need not be so shaped and any centrally located slot configuration may be employed.

Leads 22' and 23' are fed through slot 31 to form Port 1. It will be noted that substantially no magnetic material is found in the conductive loop of the circuit of Port 1 due to slots 30 and 31. In practice, these slots may be filled with epoxy or similar material to form a rigid structure and support leads 22' and 23'. The circuits of Ports 2 and 3 are similar to those of the embodiment shown in FIG. 1. Thus, essentially no mutual inductance is found between the circuits and the lack of magnetic material in the circuit of Port 1 prevents the establishing of a spurious induced magnetic field in the core structure therefrom.

Figure 5:
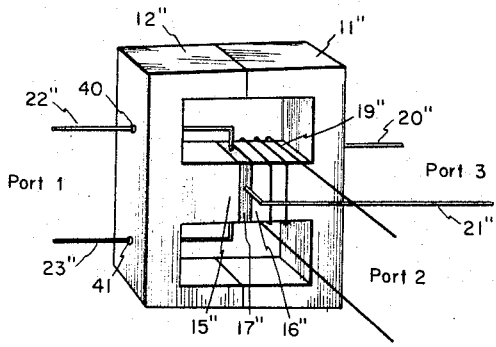
FIG. 5 is a view in perspective of a third embodiment of the invention.

A third embodiment is shown in FIG. 5 in which the coupling passage for leads 22" and 23" comprises a pair of holes 40 and 41 formed in the second E-shaped core section 12". These holes are located on the magnetic center line of core section 12" so that the net magnetic flux enclosed by the conductive loop of Port 1 is essentially zero. Thus no significant mutual inductance exists between the three circuits. In addition, the magnetic material enclosed in the circuit of Port 1 is quite small and substantially no spurious magnetic field is generated in the core structure due to the flow of current in leads 22" and 23". As seen, the first core section 11" and the coupling of the circuits of Ports 1 and 2 is similar to that shown in the "open book" and slotted embodiments.

While the above discussion has related to three particular embodiments of the invention, it is understood that many modifications may be made therein without departing from the spirit and scope of the invention.

What is claimed is:

1. A Hall-effect multiplier which comprises
 (a) a first E-shaped magnetic core section having a center arm,
 (b) a second E-shaped magnetic core section having a center arm and being mated to said first section to form a gap between the respective center arms, said second section having a centrally located coupling passage therethrough,
 (c) a Hall-effect element mounted in said gap between the center arms, the major face of said element being positioned normal to the direction of said center arms,
 (d) a field winding surrounding at least one of said center arms for receiving a first input current,
 (e) a first pair of terminals mounted on the opposing outer edges of said Hall-effect element, said first pair of terminals positioned essentially in the horizontal plane passing through the center of said center arms,
 (f) first coupling means connected to said first pair of terminals,
 (g) a second pair of terminals mounted on the edges of said Hall-effect element and positioned essentially in the vertical plane passing through the center of said center arms, said second pair of terminals being substantially equidistant from said first pair of terminals, and
 (h) second coupling means connected to said second pair of terminals through the coupling passage in said second magnetic core section to thereby substantially eliminate the induction of a spurious magnetic field in said core section when a current flows in said coupling means, the application of a second input current to one of said pairs of terminals through the corresponding coupling means resulting in a voltage being generated between the other of said pairs of terminals which is a function of the product of said first and second input currents.

2. A Hall-effect multiplier which comprises
 (a) a first E-shaped magnetic core section having a center arm,
 (b) a second E-shaped magnetic core section having a center arm and being mated to said first section to form a gap between the respective center arms, one of said sections having a coupling passage extending therethrough located on its magnetic center line,
 (c) a Hall-effect element mounted in said gap between the center arms, the major face of said element being positioned normal to the direction of said center arms,
 (d) a field winding surrounding at least one of said center arms for receiving a first input current,
 (e) a first pair of terminals mounted on the opposing outer edges of said Hall-effect element, said first pair of terminals positioned essentially in the horizontal plane passing through the center of said center arms,
 (f) first coupling means connected to said first pair of terminals,
 (g) a second pair of terminals mounted on the edges of said Hall-effect element and positioned essentially in the vertical plane passing through the center of said center arms, said second pair of terminals being substantially equidistant from said first pair of terminals, and
 (h) second coupling means connected to said second pair of terminals through the coupling passage in said second magnetic core section to thereby substantially eliminate the induction of a spurious magnetic field in said core section when a current flows in said coupling means, the application of a second input current to one of said pairs of terminals through the corresponding coupling means resulting in a voltage being generated between the other of said pairs of terminals which is a function of the product of said first and second input currents.

3. A Hall-effect multiplier which comprises
 (a) a first E-shaped magnetic core section having a center arm,
 (b) a second E-shaped magnetic core section having a center arm and being mated to said first section to form a gap between the respective center arms, said second section having a coupling passage extending therethrough located on its magnetic center line,
 (c) a Hall-effect element mounted in said gap between the center arms, the major face of said element being positioned normal to the direction of said center arms,
 (d) a field winding surrounding at least one of said center arms for receiving a first input current,
 (e) a first pair of terminals mounted on the opposing outer edges of said Hall-effect element, said first pair of terminals positioned essentially in the horizontal plane passing through the center of said center arms,
 (f) first coupling means connected to said first pair of terminals on either side of one of said core sections,
 (g) a second pair of terminals mounted on the edges of said Hall-effect element and positioned essentially in the vertical plane passing through the center of said center arms, said second pair of terminals being substantially equidistant from said first pair of terminals, and
 (h) second coupling means connected to said second pair of terminals through the coupling passage in said second magnetic core section to thereby substantially eliminate the induction of a spurious magnetic field in said core section when a current flows in said coupling means, the application of a second input current to one of said pairs of terminals through the corresponding coupling means resulting in a voltage being generated between the other of said pairs of terminals which is a function of the product of said first and second input currents.

4. A Hall-effect multiplier which comprises
   (a) a first E-shaped magnetic core section having a center arm,
   (b) a second E-shaped magnetic core section having a center arm and being mated to said first section to form a gap between the respective center arms, said second section having a coupling passage located on its magnetic center line and extending therethrough on either side of said center arm,
   (c) a Hall-effect element mounted in said gap between the center arms, the major face of said element being positioned normal to the direction of said center arms,
   (d) a field winding surrounding at least one of said center arms for receiving a first input current,
   (e) a first pair of terminals mounted on the opposing outer edges of said Hall-effect element and positioned to reside in the horizontal plane passing through the center of the face of said center arms,
   (f) first coupling means connected to said first pair of terminals on either side of one of said core sections,
   (g) a second pair of terminals mounted on the edges of said Hall-effect element, said second pair of terminals being substantially equidistant from said first pair of terminals and positioned to residue in the vertical plane passing through the center of the face of said center arms, and
   (h) second coupling means connected to said second pair of terminals through the portion of said coupling passage extending on either side of the center arm of said second magnetic core section with substantially no magnetic material being enclosed in the loop formed by said second coupling means to thereby substantially eliminate any mutual inductance between coupling means and spurious magnetic field induced by current flow in said second coupling means, the application of a second input current to one of said pairs of terminals through the corresponding coupling means resulting in a voltage being generated between the other of said pairs of terminals which is a function of the product of said first and second input currents.

5. A Hall-effect multiplier which comprises
   (a) a first E-shaped magnetic core section having a center arm,
   (b) a second E-shaped magnetic core section having a center arm and being mated to said first section to form a gap between the respective center arms, said second section having a coupling passage located on its magnetic center line and extending therethrough on either side of said center arm,
   (c) a Hall-effect element element mounted in said gap between the center arms, the major face of said element being positioned normal to the direction of said center arms,
   (d) a field winding surrounding at least one of said center arms for receiving a first input current,
   (e) a first pair of terminals comprising first and second terminals mounted on the opposing outer edges of said Hall-effect element and positioned to reside in the horizontal plane passing through the center of the face of said center arms,
   (f) first and second leads connected to said first and second terminals respectively and extending outwardly from said center arms,
   (g) a second pair of terminals comprising third and fourth terminals mounted on the edges of said Hall-effect element, said third and fourth terminals being substantially equidistant from said first and second terminals and positioned to reside in the vertical plane passing through the center of the face of said center arms, and
   (h) third and fourth leads connected to said third and fourth terminals respectively and extending outwardly therefrom, said third and fourth leads extending through the coupling passage in said second core section, the application of a second input current to one of said pairs of terminals through the corresponding leads resulting in a voltage being generated between the other of said pairs of terminals which is a function of the product of said first and second input currents.

6. A Hall-effect multiplier in accordance with claim 5 in which the coupling passage extending through said second section comprises a pair of holes located on the magnetic center line of said section.

7. A Hall-effect multiplier in accordance with claim 5 in which the coupling passage extending through said second section comprises a substantially vertical slot located on the magnetic center of said section.

8. A Hall-effect multiplier which comprises
   (a) a first E-shaped magnetic core section having a center arm,
   (b) a second E-shaped magnetic core section having a center arm and being mated to said first section to form a gap between the respective center arms, said second section and corresponding center arm having a centrally located vertical slot extending therethrough to said gap,
   (c) a Hall-effect element mounted in said gap between the center arms, the major face of said element being positioned normal to the direction of said center arms,
   (d) a field winding surrounding at least one of said center arms for receiving a first input current,
   (e) a first pair of terminals mounted on the opposing outer edges of said Hall-effect element and positioned to reside in the horizontal plane passing through the center of the face of said center arms,
   (f) first coupling means connected to said first pair of terminals on either side of one of said core sections,
   (g) a second pair of terminals mounted on the edges of said Hall-effect element, said second pair of terminals being substantially equidistant from said first pair of terminals and positioned to reside in the vertical plane passing through the center of the face of said center arms, and
   (h) second coupling means connected to said second pair of terminals through the slot in said second core section with substantially no magnetic material being enclosed in the loop formed by said second coupling means to thereby substantially eliminate any mutual inductance between coupling means and spurious magnetic field induced by current flow in said second coupling means, the application of a second input current to one of said pairs of terminals through the corresponding coupling means resulting in a voltage being generated between the other of said pairs of terminals which is a function of the product of said first and second input currents.

9. A Hall-effect multiplier which comprises
   (a) a first E-shaped magnetic core section having a center arm,
   (b) a second E-shaped magnetic core section having a center arm and being mated to said first section to form a gap between the faces of said center arms, said second section and corresponding center arm having a centrally located wedge-shaped vertical slot extending therethrough, the apex of said slot located at the inner end of said center arm,
   (c) a Hall-effect element mounted in said gap between the faces of said center arms, the major face of said element being positioned normal to the direction of said center arms, (d) a field winding surrounding at least one of said center arms for receiving a first input current, (e) a first pair of terminals mounted on the opposing outer edges of said Hall-effect element and positioned to reside in the horizontal plane passing through the center of the face of said center arms, (f) first coupling means connected to said first pair of terminals on either side of one of said core sections, (g) a second pair of terminals mounted on the edges of said Hall-effect element, said second pair of terminals being substantially equidistant from said first pair of terminals and positioned to reside in the vertical plane passing through the center of the face of said center arms, and (h) second coupling means connected to said second pair of terminals through the slot in said second core section with substantially no magnetic material being enclosed in the loop formed by said second coupling means to thereby substantially eliminate any mutual inductance between coupling means and spurious magnetic field induced by current flow in said second coupling means, the application of a second input corresponding coupling means resulting in a voltage being generated between the other of said pairs of terminals which is a function of the product of said first and second input currents.

10. A Hall-effect multiplier which comprises
(a) a first E-shaped magnetic core section having a center arm,
(b) a second E-shaped magnetic core section having a center arm and being mated to said first section to form a gap between the faces of said center arms, said second section and corresponding center arm comprising a pair of core subsections meeting at an angle to form the mating surfaces and center arm face thereof,
(c) a Hall-effect element mounted in said gap between the faces of said center arms, the major face of said element being positioned normal to the direction of said center arms,
(d) a field winding surrounding at least one of said center arms for receiving a first input current,
(e) a first pair of terminals mounted on the opposing outer edges of said Hall-effect element and positioned to reside in the horizontal plane passing through the center of the face of said center arms,
(f) first coupling means connected to said first pair of terminals on either side of one of said core sections,
(g) a second pair of terminals mounted on the edges of said Hall-effect element, said second pair of terminals being substantially equidistant from said first pair of terminals and positioned to reside in the vertical plane passing through the center of the face of said center arms, and
(h) second coupling means connected to said second pair of terminals through the opening between the pair of core subsections comprising said second core section with substantially no magnetic material being enclosed in the loop formed by said second coupling means to thereby substantially eliminate any mutual inductance between coupling means and spurious magnetic field induced by current flow in said second coupling means, the application of a second input current to one of said pairs of terminals through the corresponding coupling means resulting in a voltage being generated between the other of said pairs of terminals which is a function of the product of said first and second input currents.

11. A Hall-effect multiplier in accordance with claim 10 in which said second core section comprises a pair of symmetrical core subsections meeting to form a composite center arm face.

12. A Hall-effect multiplier which comprises
(a) a first E-shaped magnetic core section having a center arm,
(b) a second E-shaped laminated magnetic core section having a center arm and being mated to said first section to form a gap between the faces of said center arms, said second section having its laminations spread at the outer edge to form two symmetrical subsections meeting at an angle,
(c) a Hall-effect element mounted in said gap between the faces of said center arms, the major face of said element being positioned normal to the direction of said center arms,
(d) a field winding surrounding at least one of said center arms for receiving a first input current,
(e) a first pair of terminals mounted on the opposing outer edges of said Hall-effect element and positioned to reside in the horizontal plane passing through hte center of the face of said center arms,
(f) first coupling means connected to said first pair of terminals on either side of one of said core sections,
(g) a second pair of terminals mounted on the edges of said Hall-effect element, said second pair of terminals being substantially equidistant from said first pair of terminals and positioned to reside in the vertical plane passing through the center of the face of said center arms, and
(h) second coupling means connected to said second pair of terminals through opening between the pair of core subsections comprising said second core section with substantially no magnetic material being enclosed in the loop formed by said second coupling means to thereby substantially eliminate any mutual inductance between coupling means and spurious magnetic field induced by current flow in said second coupling means, the application of a second input current to one of said pairs of terminals through the corresponding coupling means resulting in a voltage being generated between the other of said pairs of terminals which is a function of the product of said first and second input currents.

13. A Hall-effect multiplier which comprises
(a) a first E-shaped magnetic core section having a center arm,
(b) a second E-shaped laminated magnetic section having a center arm and being mated to said first section to form a gap between the faces of said center arms, said second section having its laminations spread at the outer edge to form two symmetrical subsections meeting at an angle to form a composite center arm face,
(c) a Hall-effect element mounted in said gap between the faces of said center arms, the major face of said element being positioned normal to the direction of said center arms,
(d) a field winding surrounding at least one of said center arms for receiving a first input current,
(e) a first pair of terminals mounted on the opposing outer edges of said Hall-effect element and positioned to reside in the horizontal plane passing through the center of the face of said center arms,
(f) first coupling means connected to said first pair of terminals on either side of one of said core sections,
(g) a second pair of terminals mounted on the edges of said Hall-effect element, said second pair of terminals being substantially equidistant from said first pair of terminals and positioned to reside in the vertical plane passing through the center of the face of said center arms, and
(h) second coupling means connected to said second pair of terminals through opening between the pair of core subsections comprising said second core section with substantially no magnetic material being enclosed in the loop formed by said second coupling means to thereby substantially eliminate any mutual inductance between coupling means and spurious magnetic field induced by current flow in said second coupling means, the application of a second input current to one of said pairs of terminals through the corresponding coupling means resulting in a voltage being generated between the other of said pairs of terminals which is a function of the product of said first and second input currents.

References Cited
UNITED STATES PATENTS

| | | | |
|---|---|---|---|
| 2,988,707 | 6/1961 | Kuhrt et al. | 330—6 |
| 3,042,854 | 7/1962 | Maaz | 324—45 |
| 3,060,370 | 10/1962 | Varterasian | 323—94 |
| 3,097,296 | 7/1963 | Chasmar et al. | 324—45 |
| 3,143,148 | 8/1964 | Evans et al. | 338—32 |
| 3,226,657 | 12/1965 | Wiehl et al. | 329—200 |

RICHARD M. WOOD, *Primary Examiner.*

W. D. BROOKS, *Assistant Examiner.*